(12) United States Patent
Church

(10) Patent No.: US 6,480,654 B1
(45) Date of Patent: Nov. 12, 2002

(54) HIGH FIBER COUNT RIBBON SUB-UNIT BREAKOUT CABLE

(75) Inventor: Keith D. Church, Wake Forest, NC (US)

(73) Assignee: Alcoa Fujikura Ltd., Brentwood, TN (US)

(*) Notice: Subject to any disclaimer, the term of this patent is extended or adjusted under 35 U.S.C. 154(b) by 0 days.

(21) Appl. No.: 09/615,282

(22) Filed: Jul. 13, 2000

Related U.S. Application Data

(60) Provisional application No. 60/143,725, filed on Jul. 14, 1999.

(51) Int. Cl.[7] .................................................. G02B 6/44
(52) U.S. Cl. ...................................................... 385/114
(58) Field of Search ................................. 385/111, 113, 385/114

(56) References Cited

U.S. PATENT DOCUMENTS

| | | | |
|---|---|---|---|
| 4,141,623 A | * | 2/1979 | Dubost et al. ............... 385/112 |
| 5,229,851 A | * | 7/1993 | Rahman ....................... 385/114 |
| 5,233,678 A | * | 8/1993 | Katurashima et al. ....... 385/112 |
| 5,249,249 A | | 9/1993 | Eoll et al. ..................... 385/114 |
| 5,345,525 A | | 9/1994 | Holman et al. .............. 385/104 |
| 5,621,841 A | * | 4/1997 | Field ............................ 385/113 |
| 5,768,460 A | | 6/1998 | Levi et al. .................... 385/114 |
| 5,848,212 A | | 12/1998 | Wagman ...................... 385/111 |
| 5,857,051 A | | 1/1999 | Travieso et al. ............. 385/114 |
| 5,930,431 A | * | 7/1999 | Lail et al. .................... 385/100 |
| 6,185,352 B1 | * | 2/2001 | Hurley ......................... 385/114 |

* cited by examiner

*Primary Examiner*—Lynn D. Feild
*Assistant Examiner*—Hae Moon Hyeon
(74) *Attorney, Agent, or Firm*—Tracey D. Beiriger

(57) ABSTRACT

A new, unique, small diameter, more robust fiber optic breakout cable comprising a central member about which several sub-unit ribbon cables are helically stranded using a planetary stranding method. Each sub-unit ribbon cable contains a plurality of optical fibers in side-by-side relation, surrounded by strength members and encased by a protective jacket. A protective outer cable jacket encases all of the jacket protected sub-unit ribbon cables stranded about the central member.

9 Claims, 3 Drawing Sheets

HIGH FIBER COUNT RIBBON SUB-UNIT BREAKOUT CABLE

CROSS REFERENCE TO RELATED APPLICATIONS

This application claims the benefit of U.S. Provisional Application Ser. No. 60/143,725, filed on Jul. 14, 1999, the disclosure of which is fully incorporated by reference herein.

FIELD OF THE INVENTION

The present invention relates to breakout cables used for indoor applications. In particular, the present invention relates to a high fiber count ribbon sub-unit breakout cable that may be used throughout commercial buildings and the like for fiber optical wiring.

BACKGROUND OF THE INVENTION

When wiring buildings or other premises, many cables typically must be used to make the desired connections throughout various areas within the premises. To accomplish the wiring, generally a group of cables are brought into the premises and then individual cables are wired for use in the various areas. Such wiring involves stringing the cables through plenums and risers within the premises which can cause breakage or damage to the fibers within the cables because of the stress placed on the cable during the stringing.

Ribbon fiber cable is one type of optical fiber cable that is often used for wiring buildings or other premises. Ribbon fiber cable comprises one or more fiber ribbons, with each ribbon comprising a multiplicity of fibers typically embedded in a thin, flexible supporting medium. One advantage of ribbon cable is its efficient use of duct or conduit space. For a given (relatively high) fiber count, a ribbon cable can have a significantly smaller outside diameter than a stranded cable, and therefore greater fiber density, than an equal fiber count stranded cable.

U.S. Pat. No. 5,857,051 discloses a cable made up of an arrangement of optical fiber ribbon structures. Strength members are arranged above and below the fibers in each ribbon structure. A sheath is used to surround the ribbon structure and associated strength members. The sheaths about each ribbon structure create a somewhat bulky cable which is not ideal for many tight spaced applications or applications which require that the cable have a small bend radius.

SUMMARY OF THE INVENTION

The optical fiber breakout cable according to the invention is a new, unique, small diameter, more robust cable capable of better protecting the enclosed optical fibers. The breakout cable is composed of optical fiber ribbons which are optical fibers protectively encased in a side-by-side relation. Such ribbons are well known in the art and have several advantages including individual protection of the optical fibers, ease of handling and ease of identification of individual fibers. The use of ribbonized cable is especially important in wiring premises because of the need to have fiber optic connections in many different areas of the premises. Thus once a cable enters the premises, the individual ribbon cables contained within the cable may be broken out and wired to different internal locations within the premises.

The optical fiber breakout cable according to the invention comprises a central member about which several sub-unit ribbon cables are helically stranded using a planetary stranding method. Each sub-unit ribbon cable contains a plurality of optical fibers in side-by-side relation, surrounded by strength members and encased by a ribbon protective jacket. A protective outer cable jacket encases all of the jacket protected sub-unit ribbon cables stranded about the central member.

The cable of this invention can advantageously be used for indoor applications such as riser or plenum cable, and may also be used for local distribution network, including external plant applications such as distribution or buried service cable, Because of the flexibility and relatively small diameter of the cable, it is particularly well-suited for a variety of environments where a small bend radius is required.

DETAILED DESCRIPTION OF PREFERRED EMBODIMENTS

Figure 1:
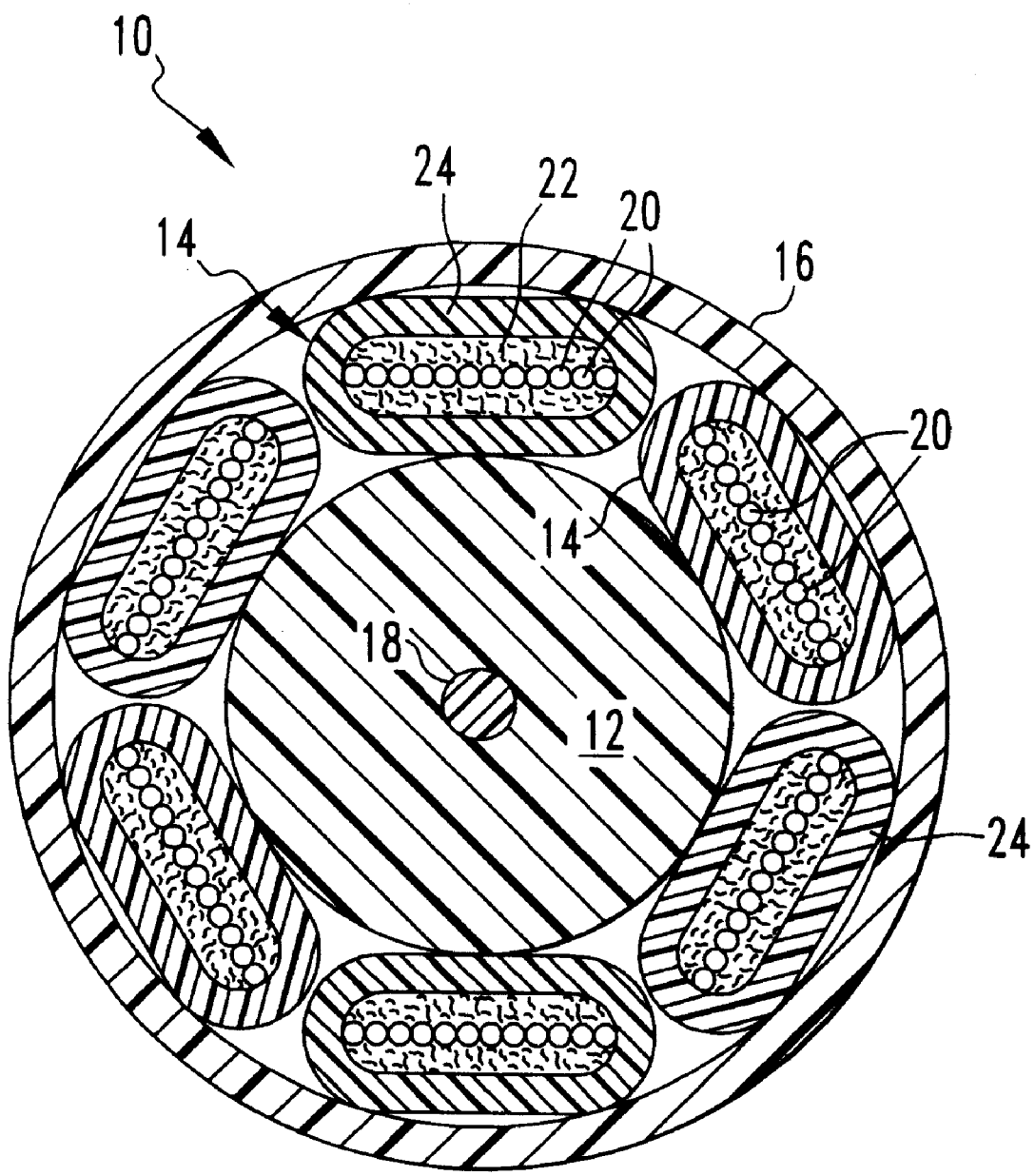
FIG. 1 is a cross section of the ribbon sub-unit breakout cable of the present invention.
Figure 3:
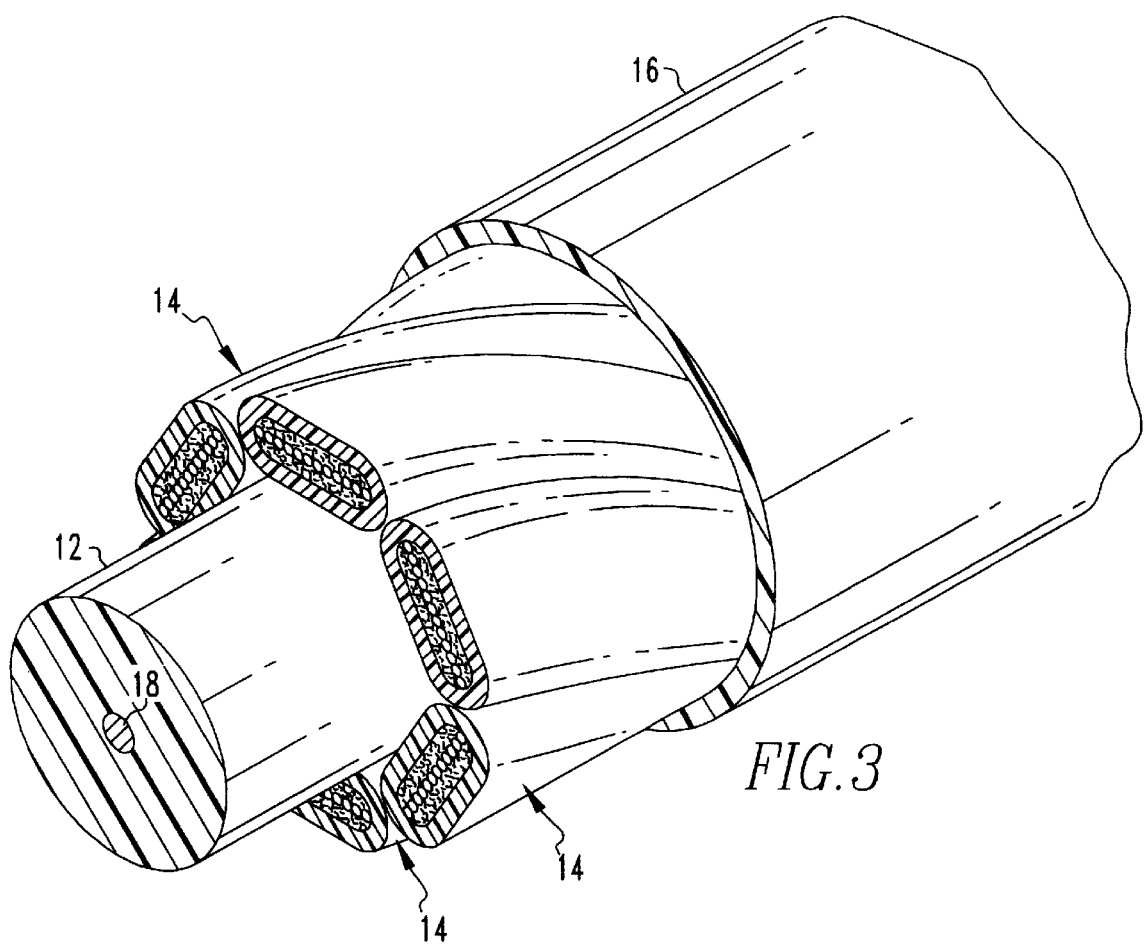
FIG. 3 is a perspective view of the breakout cable of the present invention.

The breakout cable of the present invention is shown in FIGS. 1 and 3. The cable 10 is comprised of a central member 12, several sub-unit ribbon cables 14 and a protective outer jacket 16.

The central member 12 has a fiber reinforcement plastic (FRP) rod center 18, is cylindrical and may vary in size depending on the particular application for which the cable will be used. The central member 12 is further upjacketed or coated with a flame and smoke retardant material such as polyvinlychloride (PVC). Along with providing additional protective properties, the upjacketing permits the breakout cable diameter to be easily altered if desired.

Figure 2:
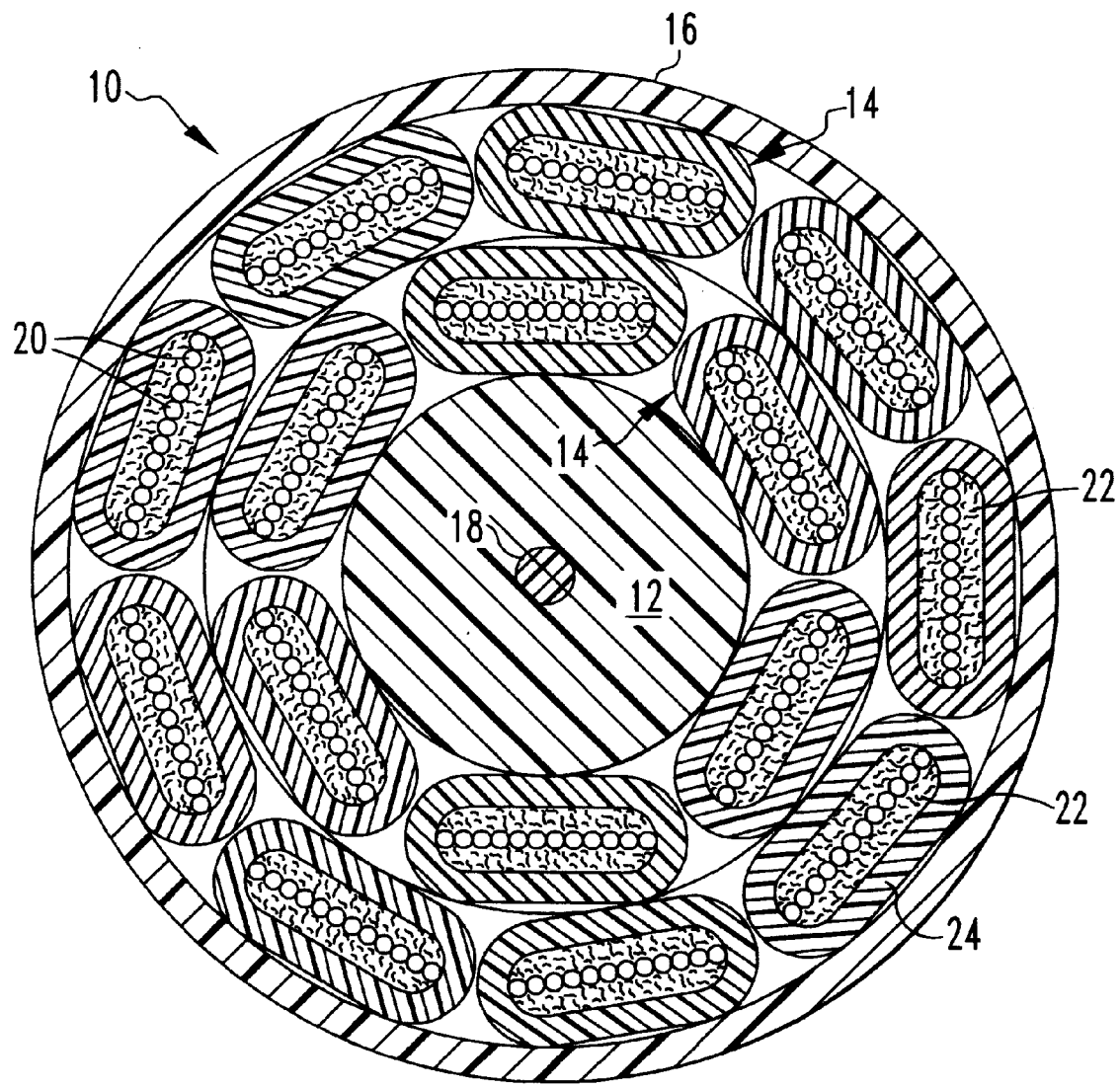
FIG. 2 is a cross section of an alternative breakout cable.

The sub-unit ribbon cables 14 are comprised of a plurality of individual optical fibers 20 which are aligned in side-by-side relation. As shown in FIG. 1, there are six sub-units 14 and each sub-unit contains twelve optical fibers creating a 72-fiber cable. The total fiber count, however, can obviously be altered by modifying either the number of sub-units or the number of individual fibers within each sub-unit. As shown in FIG. 2, the sub-units 14 can be layered to increase the number of fibers that the overall cable can carry. Even when layering the sub-units, it is not necessary to provide a protective shield about each of the inner layers as shown in FIG. 2.

Strength members 22 surround the aligned optical fibers 20 and extend longitudinally within the cable 10 to combat stress on the individual fibers. That is, the strength members rather than the optical fibers absorb the stresses created during stringing of the cable. The strength members are comprised of strength flexible material such as aramid yarn, Kevlar or other similar materials. A ribbon protective jacket 24 encases each sub-unit ribbon cable 14 including the plurality of individual optical fibers 20 and the surrounding strength members 22. The ribbon protective jacket 24 is preferably oval shaped and made of polyvinylidene fluoride (PVDF). Other suitable materials may be substituted to form the ribbon protective jacket.

The sub-unit ribbon cables 14 are helically stranded using a planetary stranding method about the central member 12. If layering the sub-units 14 as shown in FIG. 2, the layers may alternately be stranded in opposite directions. Such helically stranding permits the overall cable to be bent in several directions without causing stress to the ribbon sub-units or individual fibers. Further such stranding results in a relatively small diameter overall cable. A protective outer jacket 16 encases the central member 12 and the sub-unit ribbon cables 14 forming the high fiber count breakout cable. The outer jacket is made of a suitable material such as PVC.

The breakout cable is small in diameter, flexible, capable of bending in any direction and is easily terminated with industry standard connectors. The resulting sub-units when broken out of the main cable are designed to easily mate with industry standard connectors such as the MTP connector without any modifications. Also, each sub-unit when broken out has the same use characteristics as the main cable. Thus, if the cable is plenum and riser rated, then the individual ribbon sub-units will be riser and plenum rated. Further, because each sub-unit is readily accessible, the maintenance, repair and connection efficiency of the main cable is greatly enhanced.

Having described the presently preferred embodiments, it is to be understood that the invention may be otherwise embodied within the scope of the appended claims.

What is claimed is:

1. An optical fiber cable comprising:
   (a) a central member;
   (b) a plurality of oval shaped ribbon sub-units each having a single linear arrangement of a plurality of optical fibers in adjacent alignment surrounded by strength members and a protective ribbon jacket encasing said fibers and said surrounding strength members, said ribbon sub-units helically stranded about said central member in a planetary configuration such that ends of said linear arrangements of optical fibers oppose each other; and
   (c) an outer protective jacket encasing said central member and said ribbon sub-units.

2. The optical fiber cable of claim 1 wherein said outer protective jacket is snugly positioned about said ribbon sub-units.

3. The optical fiber cable of claim 1 wherein each said ribbon sub-unit when broken out of said cable has the same use characteristics as said cable.

4. The optical fiber cable of claim 1 wherein each said ribbon sub-unit when broken out of said cable mates with connectors.

5. The optical fiber cable of claim 1 wherein said ribbon sub-units are layered about said central member.

6. An optical fiber cable comprising:
   (a) a central member;
   (b) one or more oval shaped ribbon sub-units each having a single linear arrangement of a plurality of optical fibers in adjacent alignment surrounded by strength members and a protective ribbon jacket encasing said fibers and said surrounding strength members, said ribbon sub-units helically stranded about said central member in a planetary configuration, whereby ends of said ribbon sub-units oppose each other; and
   (c) an outer protective jacket encasing said central member and said ribbon sub-units.

7. The optical fiber cable of claim 6 wherein said outer protective jacket is snugly positioned about said ribbon sub-units.

8. An optical fiber cable comprising:
   (a) a central member;
   (b) a plurality of layers of two or more oval shaped ribbon sub-units each having a single linear arrangement of a plurality of optical fibers in adjacent alignment surrounded by strength members and a protective ribbon jacket encasing said fibers and said surrounding strength members, said ribbon sub-units helically stranded and layered about said central member in a planetary configuration such that ends of said linear arrangements of optical fibers oppose each other in each layer of ribbon sub-units; and
   (c) an outer protective jacket encasing said central member and said layers of ribbon sub-units.

9. The optical fiber cable of claim 8 wherein said outer protective jacket is snugly positioned about said plurality of layers of said ribbon sub-units.

* * * * *